(12) United States Patent
Vidal et al.

(10) Patent No.: US 10,414,097 B2
(45) Date of Patent: Sep. 17, 2019

(54) METHOD FOR REPAIRING A RADOME USING THE RADOME AS A HEATING CHAMBER AND TOOL FOR IMPLEMENTING SAME

(71) Applicants: Airbus Operations SAS, Toulouse (FR); Airbus SAS, Blagnac (FR)

(72) Inventors: Julien Vidal, Nantes (FR); Bruno Marechal, Saint Aignan de Grand Lieu (FR); Guillaume Ferrer, Toulouse (FR); Jean-Claude Marty, Toulouse (FR)

(73) Assignees: Airbus Operations SAS, Toulouse (FR); Airbus SAS, Blagnac (FR)

( * ) Notice: Subject to any disclaimer, the term of this patent is extended or adjusted under 35 U.S.C. 154(b) by 14 days.

(21) Appl. No.: 15/622,820

(22) Filed: Jun. 14, 2017

(65) Prior Publication Data
US 2017/0361537 A1     Dec. 21, 2017

(30) Foreign Application Priority Data
Jun. 20, 2016 (FR) ..................................... 16 55700

(51) Int. Cl.
*B32B 41/00* (2006.01)
*B29C 65/02* (2006.01)
(Continued)

(52) U.S. Cl.
CPC .............. *B29C 65/02* (2013.01); *B29C 65/48* (2013.01); *B29C 66/80* (2013.01); *B29C 73/34* (2013.01);
(Continued)

(58) Field of Classification Search
CPC ......... B29C 65/02; B29C 73/34; B29C 66/80; B29C 65/48; B64F 5/40; B29L 2031/3076; B29L 2031/608
(Continued)

(56) References Cited

U.S. PATENT DOCUMENTS 4,668,317 A * 5/1987 Snyder ..................... B23C 3/00
                                                   156/258
4,808,253 A    2/1989 Mimbs
(Continued)

FOREIGN PATENT DOCUMENTS

EP    2371523    10/2011
EP    2881246    6/2015
(Continued)

OTHER PUBLICATIONS

French Search Report, dated Feb. 27, 2017, priority document.

*Primary Examiner* — Michael N Orlando
*Assistant Examiner* — Joshel Rivera
(74) *Attorney, Agent, or Firm* — Greer, Burns & Crain, Ltd.

(57) ABSTRACT

A method and tool for repairing a damaged zone of an aircraft radome, using the actual radome itself as a heating chamber to avoid resorting to an autoclave and the removal of certain parts of the radome which cannot withstand the curing temperature needed for the repair. The method for repairing a radome, wherein the radome comprises a composite panel exhibiting a double curvature forming a dome, the panel comprising at least one damaged zone, comprises the steps of closing an interior space of the panel using a cap to form a repair chamber. The surface of the panel forms the repair chamber containing the damaged zone. Another step
(Continued)

is heating the space inside the repair chamber to form a heating chamber allowing the curing expected for repairing the damaged zone.

15 Claims, 2 Drawing Sheets

(51) Int. Cl.
    *B29C 65/48*     (2006.01)
    *B29C 65/00*     (2006.01)
    *B29C 73/34*     (2006.01)
    *B64F 5/40*     (2017.01)
    *B29L 31/30*     (2006.01)
    *B29L 31/60*     (2006.01)

(52) U.S. Cl.
    CPC .......... *B64F 5/40* (2017.01); *B29L 2031/3076* (2013.01); *B29L 2031/608* (2013.01)

(58) Field of Classification Search
    USPC .......................... 156/64, 350, 351, 378, 379
    See application file for complete search history.

(56) References Cited

U.S. PATENT DOCUMENTS

| | | | |
|---|---|---|---|
| 6,270,603 B1 * | 8/2001 | Westerman | B29C 35/02 |
| | | | 156/94 |
| 2011/0232829 A1 | 9/2011 | Cacace et al. | |
| 2015/0151498 A1 | 6/2015 | Witte | |

FOREIGN PATENT DOCUMENTS

| | | |
|---|---|---|
| FR | 2693147 | 1/1994 |
| FR | 2953812 | 6/2011 |

* cited by examiner

METHOD FOR REPAIRING A RADOME USING THE RADOME AS A HEATING CHAMBER AND TOOL FOR IMPLEMENTING SAME

CROSS-REFERENCES TO RELATED APPLICATIONS

This application claims the benefit of the French patent application No. 1655700 filed on Jun. 20, 2016, the entire disclosures of which are incorporated herein by way of reference.

BACKGROUND OF THE INVENTION

The present invention relates to the field of methods for repairing radomes, particularly aircraft radomes made of composite material, and to the tooling used for carrying out this type of repair.

Most aircraft and particularly commercial transport airplanes have a radome at the nose. The radome notably has the function of protecting a radar and has a structure made of a material that is permeable to electromagnetic waves, such as, for example, a composite material. The structure of the radome may become damaged by incidents of various types, such as bird strike or hail, and may exhibit a dent, a tear, scoring, or any other form of damage requiring repair.

Patent application FR2953812 discloses one example of how to repair a fuselage made of composite. As set out in the application, it is necessary to make a cut around the damaged zone in order to remove it and place a patch in the opening made by cutting out, which patch is fixed by curing in the case of a thermosetting resin.

In the case of a radome, in order to perform polymerization, the radome is removed from the aircraft and placed in a heating chamber such as an autoclave, an oven or the like. Now, the frame that is at the free end of the composite radome and that connects it to the aircraft fuselage, as well as other elements of the radome are, in some aircraft, made of a metallic material, which material is unable to withstand the temperature required for polymerizing the resin (over 60° C.).

That means that all the metallic parts have to be removed from the radome, particularly the frame that forms the interface with the fuselage, before curing can take place. This results in a significant increase in the repair time caused solely by the removal of these metallic parts, and in a repair method that is cumbersome and restrictive notably requiring the radome to be transported around and access to remotely-situated heating chambers.

It is an object of the present invention to propose a repair method and a tool for implementing this method that make it possible to alleviate the problem of time and of the difficulty of removing all of the metallic components from a radome and of transporting the radome around and gaining access to suitable heating chambers.

SUMMARY OF THE INVENTION

In order to achieve this, the present invention relates to a method for repairing a radome comprising a panel exhibiting a double curvature forming a dome, the panel comprising at least one damaged zone, characterized in that it comprises the following steps:
   closing an interior space of the panel using a cap to form a chamber, referred to as repair chamber, the surface of the panel forming the repair chamber containing the damaged zone;
   heating the space inside the repair chamber thus forming a heating chamber allowing the curing expected for repairing the damaged zone.

The method comprises using the actual radome itself as the heating chamber, so as to avoid resorting to an autoclave and avoid removing certain parts of the radome that are unable to withstand the necessary curing temperature.

The repair method has at least one of the following optional features, considered in isolation or in combination.

The method comprises a step of preparing the damaged zone by making cutouts and inserting replacement elements in the cutouts made, requiring cooling to fix the elements to the panel.

The heating step comprises detecting at least a temperature inside the heating chamber so as to control the heating of the chamber so as to attain a repair temperature.

The method comprises a step of agitating the air contained in the chamber.

The method comprises a step of deploying a deployable seal between the cap and the panel to allow the repair chamber to be hermetically sealed.

It comprises a step of retaining the cap by fitting at least one longilinear spacer one end of which bears against the external face of the cap and the other end of which bears against a fixed structure.

It comprises a step of installing means of supporting the panel to facilitate access to the heating chamber.

It comprises a step of installing an insulating cover on at least part of the external face of the radome panel.

The present invention also relates to the tool for repairing a radome comprising a panel exhibiting a double curvature forming a dome, the panel having at least one damaged zone, characterized in that the tool comprises the actual panel itself, a cap allowing a space inside the radome panel to be closed off to form a chamber referred to as a repair chamber, the surface of the radome panel forming the repair chamber containing the damaged zone, and heating means allowing the heating of the interior space of the repair chamber thus forming a heating chamber allowing the curing expected for repairing the damaged zone.

The tool has at least one of the following optional features, considered in isolation or in combination.

The cap is formed as a single unit and has a shape the outline of which corresponds to the interior outline of the panel against which it is to press.

The heating means take the form of a hot-air-generating device that can be incorporated removably into the cap and pass through it via an orifice provided for that purpose.

The tool comprises means of agitating the air.

The free peripheral edge of the cap comprises a deployable seal.

Temperature detection means are provided inside the repair chamber; the detection means being coupled to a control center controlling the means of heating the repair chamber.

The tool comprises at least one longilinear spacer one end of which bears against the external face of the cap and the other end of which bears against a fixed structure.

BRIEF DESCRIPTION OF THE DRAWINGS

Other objects, advantages and features of the invention will become apparent from reading the description which will follow of the repair method and tool according to the invention, which is given by way of non-limiting example with reference to the attached drawings in which.

DETAILED DESCRIPTION OF THE PREFERRED EMBODIMENTS

Figure 1:
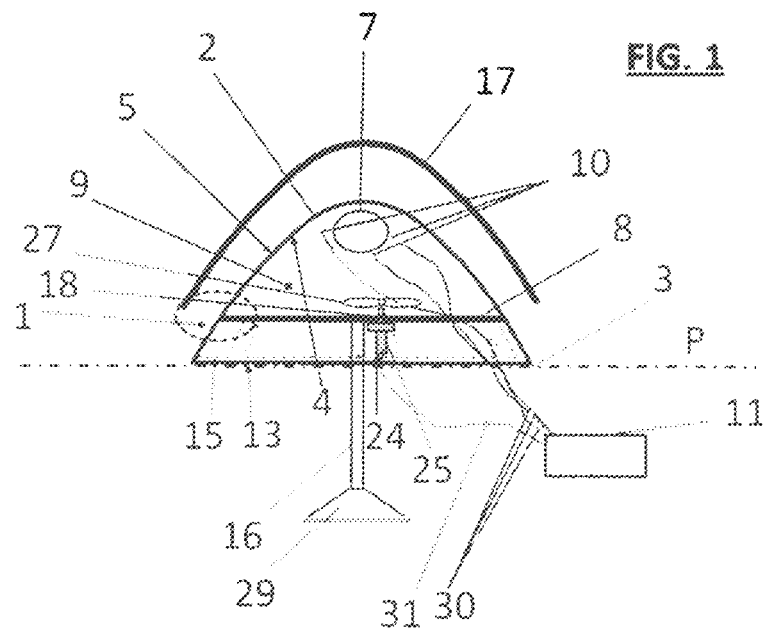
FIG. 1 depicts a simplified schematic view in section of a radome repair tool according to the present invention.
Figure 2:
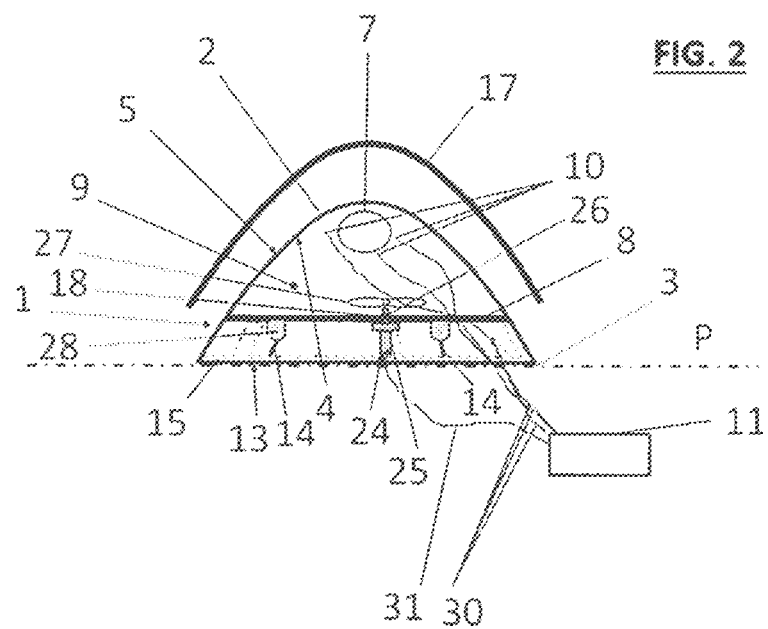
FIG. 2 depicts a simplified schematic view in section of another form of embodiment of a repair tool according to the present invention.

As FIGS. 1 and 2 show, the present invention relates to a method for repairing a radome 1 and more particularly in the example described hereinbelow, an aircraft radome.

The radome 1 comprises a panel 2 made of material permeable to electromagnetic waves, such as, for example, composite material. The panel 2 exhibits a double curvature to form a concavity in the form of a dome. The free peripheral edge 3 of the radome 1 is connected, generally in an articulated manner, by any type of known means to the rest of the aircraft fuselage. In the description that follows, it will be considered that the radome has been removed and taken away from the aircraft as shown in FIGS. 1 and 2. The panel 2 has an internal face 4 and an external face 5. The internal face 4 of the panel is hollow. In the embodiments illustrated in FIGS. 1 and 2, the free peripheral edge 3 or at least part of the edge belongs to a plane P: as a result, the radome can rest against a planar surface and, in particular, on the ground via its peripheral edge 3 or the part thereof belonging to the plane P, the part in question of the edge 3 being sufficiently large in size to be able to do this.

The radome 1 will not be described further in detail: it may comprise other components such as lightning strips or the like a description of which is unnecessary for setting out the repair method and tool.

Because it is exposed at the nose of the aircraft, the panel 2 suffers damage which needs to be repaired.

The repair method comprises several steps, the first of which is to reconstruct the panel 2 of the radome 1 in a damaged zone 7. To do this, a cutout is made using a procedure of known type in order to remove the damaged zone 7 and replacement elements are used to fill the cutout made. In the known way, and according to an illustrative example, the composite panel 2 is the result of the superposition of a certain number of plies on the side of the internal face 4, of a layer of honeycomb and then of a certain number of plies on the side of the external face 5. According to one procedural example, still by way of illustration, the plies of the panel 2 are cut out, the cutouts being of decreasing size from the internal face 4 to the external face 5. The layer of honeycomb is also cut out to the same outline as the ply closest to the layer on the side of the external face 5. The plies and the layer of honeycomb are then reconstructed: a first composite repair component, the shape of the outline of which is identical of that of the outline of the cutout of the ply situated on the external face 5 and which is very slightly smaller in size is inserted into the cutout. A second component larger in size than the first component and the shape of the outline of which is identical to the shape of the outline of the cutout of the ply closest to the previous one and which is very slightly smaller in size is inserted into the cutout of this second ply and so on as far as the layer of honeycomb. A repair portion of honeycomb is inserted into the cutout in the layer of honeycomb: a layer of adhesive is provided on the lower and upper face of the layer of honeycomb to bond to the closest plies. The insertion of peak components into the cutouts of the plies is then resumed as far as the internal face 4.

Once the zone 7 has been reconstructed, the method involves a step of heating the radome and, more particularly, the damaged zone 7, in order to perform the curing operation that will fix the repair components and repair portion of honeycomb to the cut-out radome panel 2.

The repair method uses the concavity of the radome 1 to create from it a heating chamber. Thus, an interior space of the dome formed by the radome panel 2 is closed with an insulating cap 8 to form a chamber 9, referred to as the repair chamber. The surface of the panel 2 forming the repair chamber 9 contains the damaged zone 7 that is to be repaired and does not contain the free peripheral edge 3. According to the embodiment illustrated, the insulating cap 8 is formed as a single unit, making it easier to move around and to install inside the radome. The outline of the cap 8 has a shape corresponding to that of the interior outline of the radome against which it presses. Thus, all that is required is to take hold of the cap and move it to introduce it into the radome against the internal face 4 of which it will press in order to form the heating chamber.

Once the repair chamber 9 has been closed by the cap 8, the space inside the chamber is heated: the repair chamber becomes a heating chamber. Heating is performed to a curing temperature such that the surface of the panel 2 that forms part of the repair chamber is unaffected unlike the zone 7. A composite panel polymerizes at a temperature $T1$ referred to as the curing temperature. To make the repair, there is no need to reach the curing temperature $T1$. It is enough to reach a temperature $T2$ lower than the curing temperature $T1$ and to maintain it for longer than the time needed for curing. Thus, the procedure used to repair a panel in heating chambers of the autoclave or oven type comprises heating the damaged zone 7 to a repair temperature $T2$ lower than the curing temperature $T1$ and for longer than the time needed to polymerize a panel. The same procedure is used in the heating chamber 9. The panel 2 in its entirety is thus able to withstand the heat in order to perform its function as a heating chamber 9.

In addition, because the free peripheral edge 3 is outside the heating chamber 9, there is no need to remove the metal frame 15 or all the other elements which are fixed to the edge 3 in order to provide the interface with the rest of the fuselage or on the surface of the panel 2 comprised between the free peripheral edge and the cap. The method thus allows the actual radome itself to be used as a heating chamber.

The heating step may comprise detection of at least one temperature inside the heating chamber 9 so as to control the heating of the chamber to the repair temperature $T2$. At least one temperature measuring sensor 10 is installed on the internal face 4 of the panel 2 belonging to the chamber 9 or of the cap 8 and transmits the detected temperature(s) to a control center 11 external to the heating chamber 9. An operator can thus view the temperature reached at various points of the heating chamber 9, check its value and consistency if several temperatures have been measured, and regulate the heating if necessary. This regulation may also be performed automatically. The use of several sensors 10 allows the consistency of the temperature in the chamber 9 to be checked. It also has the purpose of ensuring measurement in the event of a failure of one of the sensors or of detecting the failure of a sensor through isolated false readings. The sensors are arranged near the damaged zone 7. Specifically, it is necessary to achieve the repair temperature T2 in the region of the zone 7 but not essential to achieve it elsewhere throughout the chamber 9.

The method may comprise a step of agitating the air contained in the repair chamber 9. According to one particular embodiment, the agitating of the air is triggered together with the start of the heating but it may start before or after the start of the heating. The agitating of the air is intended to even out the distribution of the hot air in the heating chamber in order to ensure the same polymerization conditions across the entire surface of the damaged zone 7.

The method may comprise a step of deploying a deployable seal 12 between the cap 8 and the panel 2 to allow the repair chamber 9 to be hermetically sealed. Once the cap is in place, deployment of the seal 12 is activated by blowing, inflation, mechanical actuation or any other type of action allowing this. Deployment of the seal allows the joint between the cap 8 and the panel 2 to be isolated. In the embodiment illustrated in FIGS. 3 and 4, the peripheral edge of the cap 8 is provided with the seal 12. The seal 12 deploys by deformation and, more specifically in the embodiment illustrated, by inflation. The seal deploys towards the outside of the cap 8, namely in the direction of the panel 2, once the cap is installed. The seal presses against the panel 2 and hermetically seals the heating chamber 9. Once the repair has been made, it is possible to reinsert the seal into the cap manually or by suction.

In the case of a cap 8, the dimensions of which are not suited to those of the radome 1 to allow the creation of a chamber containing the damaged zone 7, the use of a deployable seal 12 may allow the cap to be adapted to suit various sizes or shapes of radome panel 2. The cap 8 therefore need not have dimensions that perfectly correspond to those of the panel 2. Thanks to the use of a deployable seal 12, it is suitable for various types, shapes and sizes of radome.

The method has a step of holding the cap in place to form a heating chamber 9. This step may be combined with the previous step of hermetically sealing the chamber: specifically, the seal may have an adhesion function such that it holds the cap in place.

The holding step may also precede or follow the seal-deployment step. The cap may be held in place in various ways.

According to one possible embodiment, the method comprises using removable fastening systems of the scotch tape "VELCRO" (registered trademark), screw/nut or another type. These systems join the external face 13 of the free peripheral edge of the cap to the internal face 4 of the panel.

According to one particular embodiment illustrated in FIG. 2, the method comprises installing a removable fixing system in the form of at least one longilinear spacer 14 of which one end bears against the external face 13 of the cap and of which the other end bears against a fixed structure to hold the cap in place. The fixed structure may be of any kind, the ground, a wall, a platform, or even the radome itself.

According to the embodiment illustrated, the fixed structure comprises the structure of the actual radome itself. The method may therefore be performed anywhere, on any surface. The spacer bears, for example, against the metal frame 15 fixed at the free peripheral edge 3 of the panel 2 to hold in place via its other end the cap to which it is fixed. The number of spacers is determined according to need, the spacers being evenly distributed over the surface of the cap.

The removable fixing systems may be combined with one another; for example, scotch tape may be used for an initial hold, strengthened by the addition of spacers.

Access underneath the dome of the panel 2 makes the repair method easier to implement. The dome can therefore, instead of resting on a surface, be suspended or fixed in such a way as to allow free access to the heating chamber. The method comprises a step of installing means 16 of supporting the panel 2 to facilitate access to the heating chamber 9.

According to the embodiment depicted in FIG. 1, the panel 2 is held at a height using a support 16. Thus, the tool is placed on the ground by means of the support 16 and all that is required is for the radome to be brought over and placed over the tool. In the embodiment illustrated in FIG. 1, the support takes the form of a single central leg widening at its bottom end to rest stably on the surface on which it stands. The leg and the widened base may have varying shapes as will be described later on. The leg here is a single leg but, just like with a table, the support may comprise more than one leg or take any other type of form.

The method may have a step of fitting a thermally insulating cover 17 to cover the external face 5 of the radome panel 2. The insulating cover 17 accelerates the rise in temperature and enhances the thermal insulation of the heating chamber 9.

The repair method thus offers the advantages of avoiding the need to resort to cumbersome means such as an autoclave or an oven, having to remove radome components such as the frame 15 located at the free peripheral edge of the panel 2, and transporting the radome over long distances. The method can be performed quickly, easily and anywhere. It may be applied to all types of radome.

The repair method requires the use of a tool set out in broad lines in the preceding description of the method and in greater detail in what follows.

In the embodiment illustrated in FIGS. 1 and 2, the tool comprises the cap 8 allowing the radome panel 2 to be closed up. The cap 8 therefore has a shape that corresponds to that of the panel 2 and, more precisely, of the dome formed by the internal face 4 of the panel 2. If the panel 2 is hemispherical, the cap 8 takes the form of a disc. The cap comprises an orifice 18 made, for example, in the center of its surface, namely in the case of a disc, at the center of the disc. The orifice 18 may be provided elsewhere than at the center of the cap (FIGS. 1 and 2).

According to the forms illustrated in FIGS. 1 and 2, the cap 8 has a planar surface of which the free peripheral edge 3 comes into contact with the internal face 4 of the panel 2. In the embodiment illustrated in FIGS. 3 and 4, the cap comprises two panels, an upper panel 19 and a lower panel 20 made of composite material. The two panels are separated by a layer of thermally insulating foam 21.

It is possible to conceive of a cap that has no planar surface. It is possible for example to conceive of a curved surface making it possible to reduce the volume of the heating chamber. However, as shown in FIGS. 1 and 2, a planar surface is, for many configurations, the most optimized surface in order to facilitate installation.

Figure 3:
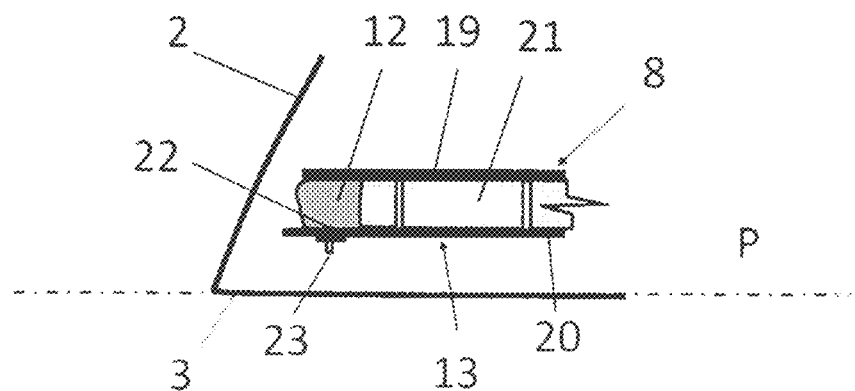
FIGS. 3 and 4 depict a partial enlarged and detailed schematic view in cross section of the zone outlined in dotted line in FIG. 1, of one embodiment of the cap of the repair tool according to the present invention.
Figure 4:
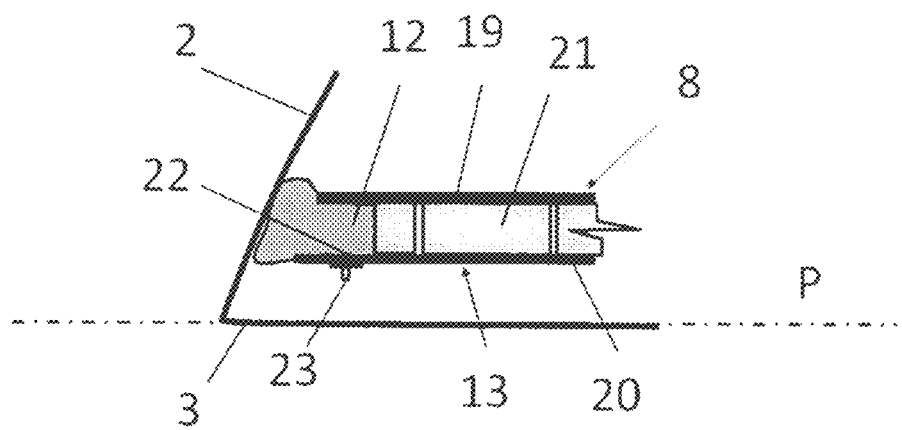

As FIGS. 3 and 4 show, and as was seen earlier, the peripheral edge of the cap is provided with the deployable seal 12. The seal 12 may be deployed by deformation, mechanical retraction of the sliding type, or the like. In the embodiment illustrated, deployment takes place by deformation and more specifically by inflation. The seal 12 takes the form of an air chamber housed inside the peripheral edge of the cap over the entire perimeter. An air inlet 22 is provided into the air chamber to which access is gained via a valve 23 accessible from the external face 13 of the cap. By inflating from the valve 23, the air chamber fills with air and deforms. The exterior peripheral edges of the lower panel 20 and of the upper panel 19 are not joined, so as to leave the air chamber free to expand out of the cap, towards the outside thereof. In one illustrative embodiment, "VEL-CRO" (registered trademark) ties may be provided on the periphery of the cap to prevent the seal 12 from leaving its housing while it is being stored or transported. The ties are released at the time of installation of the cap. The size of the air chamber is such that, once inflated, it comes into contact with and presses or even sticks by pressure against the internal face of the panel 2 in order to hermetically seal the repair chamber. The shape and size of the cap are determined in relation to the shape and size of the radomes onto which it is intended to be applied and with respect to the presence and shape of the seal. Provision may also be made for suction to be applied via the valve 23 using a suction device of known type, in order to return the seal 12 to the inside of the cap.

The repair tool comprises heating means 24 allowing the interior space of the repair chamber 9 forming the heating chamber to be heated and allowing the expected curing for repairing the damaged zone 7. As FIGS. 1 and 2 show, the heating means 24 take the form of a hot-air-generating device 25 able to be incorporated removably into the cap. The heating means for example take the form of a hot air gun 25 of which the pipe 26 that expels the hot air is introduced into the orifice 18 provided at the center of the cap. The hot-air-generating device 25 is fixed removably to the cap, for example using flanges. Any other type of fixing may be used.

The tool comprises means of agitating the air. In the embodiment illustrated in FIG. 1, the agitating means take the form of an electric fan 27. The agitating means could also take the form of a mechanical deflector. It may be arranged and fixed inside the chamber 9 using any type of known means. In the example illustrated, the fan rotor 9 is associated with the expulsion pipe 26 of the hot-air-generating device. Thus, it is as close as possible thereto and allows optimized agitation.

The fan adopts a shape such that it also acts as a deflector. The deflector may also be independent of the fan and, for example, take the form of a perforated sheet positioned some distance from the outlet of the heating means and, in the example described, of the hot air gun. The deflector makes it possible to avoid a hot spot in line with the gun, and to distribute the temperature evenly and in an optimized manner throughout the heating chamber.

As seen earlier, the radome repair tool comprises at least one longilinear spacer 14 of which one end bears against the external surface of the cap and of which the other end bears against a fixed structure to allow the cap to be held in place. In the embodiments illustrated in FIGS. 1 and 2, the fixed structure is the frame 15 fixed to the free peripheral edge 3 of the panel 2. The spacer 14 runs along the internal face of the panel 2 between the frame and the external face of the cap. The spacers are distributed all around the periphery of the cap. The spacers are fixed to the external face of the cap using any articulated jointing system 28 of known type.

To improve insulation, it is also possible to cover the radome with an insulating cover 17. This needs to be of a shape such that it entirely covers the external face of the radome panel 2, or at least covers it as far as the cap 8. The cover 17 is made of an insulating material of known type.

The repair tool may comprise support means 16 to facilitate access to the heating chamber. These means are not compulsory. Specifically, once all of the components of the tool are in place, the radome can rest on the ground or on any other surface and control of the heating is performed via the control center 11 which can be external to and remote from the radome.

FIG. 1 illustrates one embodiment of the support means. The support means take the form of a support 16 of the table leg type. In the example, just one leg 16 is provided, bearing at one end on the ground via a stabilizing base 29 and at the other end supporting the cap in its center. The leg is fixed removably or non-removably to the cap. The leg is, for example, cylindrical in shape, of circular, rectangular or other cross section. The base 29 is, for example, in the shape of a cone, a pyramid, or some other shape. To facilitate installation of the heating means 24 and a central location for the latter, the support 16 may have more than one leg allowing them to be distributed about the center of the cap, leaving the center free for installing the heating means.

The repair tool may comprise temperature detection means provided inside the repair chamber, the detection means being coupled to the control center 11 of the repair chamber heating means. The detection means take the form of measurement sensors 10 such as thermocouples. The detection means comprise at least one sensor. The sensor or sensors 10 are arranged inside the repair/heating chamber and, more particularly, as illustrated in FIG. 1, on the internal face of the radome. In the example of FIG. 1, three sensors are depicted. The sensors are connected to the control center external to the radome by a link 30 for example of wired type, that can be routed through the central orifice, round the outside of the cap (between the cap and the radome panel 2) or even through complementary orifices made in the cap.

The external control center 11 takes the form of a carry case for displaying the measured data and controlling the heating and air agitation/deflection means for the air contained in the heating chamber. To do this, the control center is also connected by a link 31, for example of the wired type, to the heating means and to the air agitation and deflection means.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for repairing a radome, the radome comprising a composite panel exhibiting a double curvature forming a dome, the panel comprising at least one damaged zone, comprising the following steps:

closing an interior space of the dome of the composite panel using a cap to form a repair chamber, a surface of the dome of the composite panel forming the repair chamber containing the damaged zone, wherein the cap has a shape corresponding to an interior surface of the radome;

heating the space inside the repair chamber, thus forming a heating chamber allowing a curing expected for repairing the damaged zone, wherein the heating chamber is formed by the dome and the cap.

2. The method for repairing a radome according to claim 1, further comprising a step of preparing the damaged zone by making cutouts and inserting replacement elements in the cutouts made, requiring cooling to fix the elements to the panel.

3. The method for repairing a radome according to claim 1, wherein the heating step comprises detecting at least a temperature inside the heating chamber so as to control the heating of the chamber so as to maintain the temperature lower than the curing temperature of the composite panel.

4. The method for repairing a radome according to claim 1, further comprising a step of agitating air contained in the chamber.

5. The method for repairing a radome according to claim 1, further comprising a step of deploying a deployable seal between the cap and the panel to allow the repair chamber to be hermetically sealed.

6. The method for repairing a radome according to claim 1, further comprising a step of retaining the cap by fitting at least one longilinear spacer, one end of which bears against an external face of the cap, and the other end of which bears against a fixed structure.

7. The method for repairing a radome according to claim 1, further comprising a step of installing means of supporting the panel to facilitate access to the heating chamber.

8. The method for repairing a radome according to claim 1, further comprising a step of installing an insulating cover on at least part of the external face of the radome panel.

9. A tool for repairing a radome, the radome comprising a composite radome panel exhibiting a double curvature forming a dome, the radome panel having at least one damaged zone, the tool comprising:
the actual radome panel itself,
a cap allowing a space inside the dome of the radome panel to be closed off to form a repair chamber, wherein the cap has a shape, an outline of which corresponds to an interior outline of the radome panel against which the cap is to press,
a surface of the dome of the radome panel forming the repair chamber containing the damaged zone, and
heating means allowing the heating of the interior space of the repair chamber, thus forming a heating chamber allowing a curing expected for repairing the damaged zone, wherein the heating means comprises a hot air generator.

10. The tool for repairing a radome according to claim 9, wherein the cap is formed as a single unit and, a free peripheral edge of the radome panel being outside the heating chamber, when the cap is pressed against the panel of the radome.

11. The tool for repairing a radome according to claim 9, wherein the heating means take the form of a hot-air-generating device that is configured to be incorporated removably into the cap and pass through the cap via an orifice in the cap.

12. The tool for repairing a radome according to claim 9, further comprising means for agitating the air inside the repair chamber.

13. The tool for repairing a radome according to claim 9, wherein a free peripheral edge of the cap comprises a deployable seal.

14. The tool for repairing a radome according to claim 9, further comprising temperature detection means inside the repair chamber, the detection means being coupled to a control center configured to control the means of heating the repair chamber.

15. The tool for repairing a radome according to claim 9, further comprising at least one longilinear spacer, one end of which bears against an external face of the cap and another end of which bears against a fixed structure.

* * * * *